June 14, 1932.  A. RAMSAY  1,862,633
METHOD OF PERFORATING SHEET RUBBER
Filed May 2, 1930
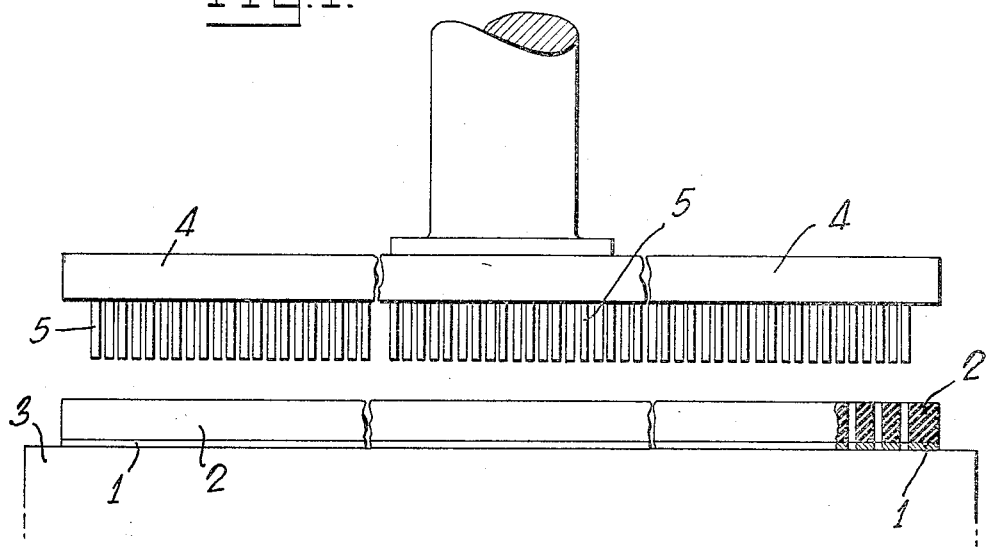
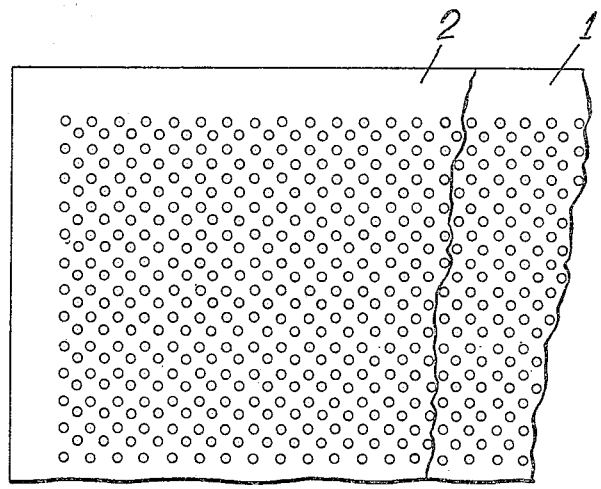
INVENTOR.
Allan Ramsay
BY
ATTORNEY Patented June 14, 1932

1,862,633

UNITED STATES PATENT OFFICE

ALLAN RAMSAY, OF CARBONDALE, PENNSYLVANIA, ASSIGNOR TO HENDRICK MANUFACTURING COMPANY, OF CARBONDALE, PENNSYLVANIA, A CORPORATION OF PENNSYLVANIA

METHOD OF PERFORATING SHEET RUBBER

Application filed May 2, 1930. Serial No. 449,099.

This invention relates to a method of perforating sheet rubber, and more particularly relates to a method whereby very small perforations located closely together may be formed in sheet rubber by means of perforating presses of standard construction.

Heretofore, it has been considered impossible to perforate sheet rubber with a plurality of small holes in predetermined arrangement, or placed closely together, by means of a perforating press. Due to its elastic character, bare sheet rubber assumes all sorts of contorted shapes in the press, becoming bunched at one location, stretched at another, and squirming about, all in such a way as to defeat being perforated by the press in a satisfactory manner.

I have discovered that when suitable inelastic material, preferably perforable, is bonded to one side of the rubber sheet to be perforated, the rubber sheet may be satisfactorily perforated by means of a perforating press, and the perforations may be made very small and close together, and in any desired symmetrical or arbitrary arrangement. For instance, by this method I have been able to perforate sheet rubber, such as is commonly used for the inner tubes of automobile tires and what is also known commercially as "Navy No. 2", with a perforating press equipped with punches having diameters of one thirty-second of an inch and spaced approximately the same distance apart, and have been able to form very minute perforations in sheet rubber in an even, symmetrical arrangement by means of a perforating press of standard construction. Rubber sheets having a uniformly distributed multiplicity of such minute yet definite perforations have gone into extensive use with superior results as the porous medium for aerating and fluid distributing apparatus, the aerating or distributed fluid passing through the perforations uniformly in minute bubbles or streams. Such sheets also may serve as filters and as mashing or mixing screens, and other uses which will be apparent to those skilled in the art.

In order that a clearer understanding of my invention may be had, attention is hereby directed to the accompanying drawing, forming a part of this application and showing, for purposes of illustration, in Fig. 1, a side view of a rubber sheet and its stretch-resisting backing, partly in section and partly broken away, and perforated in accordance with my method, the view also showing diagrammatically the die and punch of a perforating press adapted to be used in carrying out my method; and in Fig. 2, an elevation of a sheet of rubber, with the stretch-resisting backing thereon, and perforated by means of my improved method, both views of the drawing showing the rubber sheet, the perforations and the associated parts in a greatly enlarged scale.

Similar reference characters refer to similar parts throughout both views of the drawing.

Referring to the drawing, a sheet of inelastic material 1 is bonded, as by means of suitable cement or paste, over one surface of the rubber sheet 2 which is to be perforated. The sheet is now placed on the die member 3 of a perforating press, preferably with the stretch-preventing material 1 against the face of the die. The press is then operated in the usual way to perforate the sheet, the punch 4 of the press having a plurality of perforating members 5, conforming in size and arrangement to the size and arrangement of the perforations desired to be formed in the rubber sheet. When the press is operated in the usual manner the members 5 penetrate the rubber sheet 2 and its backing 1, forming the desired perforations therein.

The primary requirement for the backing 1 is that it hold the sheet rubber 2 against becoming so distorted and contorted under the action of the punch, that satisfactory perforating cannot be obtained; and to this end the backing should be so firmly secured to the rubber sheet that the sheet will not be displaced relatively to the backing during the punching operation. The backing material, accordingly, should be material which is inelastic and also tough enough so as not to rip or tear under the tensions and pressures transmitted through the rubber sheet when it is undergoing the punching operation.

Obviously, many different materials can be chosen for the backing material and many different compositions of paste or cement can be used to secure the backing to the rubber sheet with a bonding action sufficiently firm and strong for the purpose. Preferably, I employ parchment paper for the backing, since this material is very tough and strong, rather than brittle. A brittle paper is apt to crack and tear, and the fibres of fibrous material are apt to block up the dies.

In practice, I prefer to moisten the uncovered side of the sheet slightly, but do not wet the side which has the backing.

After the sheet has been perforated, the backing paper may or may not be removed, as desired.

Obviously, the size and arrangement of the perforations may be arbitrarily determined and obtained by providing a punch having punching prongs of the proper size mounted in the desired arrangement. By using punching prongs of sufficiently small diameter, rubber sheeting may be perforated with exceedingly small perforations, so fine in fact, that it is barely possible to see light through them. Due to the elasticity of the rubber, the perforations will appear in the completed sheet smaller than the diameter of the punching prongs of the perforating press.

As many changes could be made in the above method, and as many apparently widely different embodiments of this invention could be made without departing from the scope thereof, it is understood that all matter contained in the above description or shown in the accompanying drawing shall be interpreted as illustrative and not in a limiting sense.

What I claim is:

1. The method of producing a cured rubber sheet having a multiplicity of minute and definite apertures therethrough, which includes bonding stretch-resisting material to one surface of a sheet of cured elastic rubber and then punching a multiplicity of minute and definite apertures simultaneously in the sheet while held against stretching by said stretch-resisting material.

2. The method of producing a cured rubber sheet having a multiplicity of minute and definite apertures therethrough, which includes bonding parchment paper to one surface of a sheet of cured elastic rubber and then punching a multiplicity of minute and definite apertures simultaneously in the sheet while held against stretching by said parchment paper.

3. The method of producing a cured rubber sheet having a multiplicity of minute and definite apertures therethrough, which includes bonding stretch-resisting material to one surface of a sheet of cured elastic rubber and then punching in the sheet, while held against stretching by said stretch-resisting material, a multiplicity of holes simultaneously by means of a perforating press having a multiplicity of simultaneously operating punching prongs.

4. The method of producing a cured rubber sheet having a multiplicity of minute and definite apertures therethrough, which includes bonding stretch-resisting material to one surface of a sheet of cured elastic rubber and then punching in the sheet, while held against stretching by said stretch-resisting material, a multiplicity of holes simultaneously by means of a perforating press having a multiplicity of simultaneously operating punching prongs of approximately one thirty-second of an inch in diameter.

5. The method of producing a cured rubber sheet having a multiplicity of minute and definite apertures therethrough, which includes bonding stretch-resisting material to one surface of a sheet of cured elastic rubber and then punching in the sheet, while held against stretching by said stretch-resisting material, a multiplicity of holes simultaneously by means of a perforating press having a multiplicity of simultaneously operating punching prongs of approximately one thirty-second of an inch in diameter and spaced approximately one thirty-second of an inch apart.

6. The method of producing perforated sheet rubber of the character described, which includes punching simultaneously a plurality of minute perforations closely together in a sheet of vulcanized rubber having a sheet of substantially inelastic material bonded to one face thereof.

7. The method of producing perforated sheet rubber of the character described, which includes punching simultaneously a plurality of minute perforations closely together in a sheet of vulcanized rubber having a sheet of substantially inelastic material bonded to the face thereof presented away from the perforating punches.

8. The method of producing perforated sheet rubber of the character described, which includes punching simultaneously a plurality of minute perforations closely together in a sheet of vulcanized rubber having a sheet of paper bonded to one face thereof.

This specification signed this 30th day of April, 1930.

ALLAN RAMSAY.